(12) United States Patent
Meylan et al.

(10) Patent No.: US 8,995,407 B2
(45) Date of Patent: Mar. 31, 2015

(54) NEIGHBOR DISCOVERY IN A WIRELESS SYSTEM

(71) Applicant: QUALCOMM Incorporated, San Diego, CA (US)

(72) Inventors: Arnaud Meylan, San Diego, CA (US); Santosh Abraham, San Diego, CA (US); Shravan K. Surineni, Waltham, MA (US); Sanjiv Nanda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 13/788,160

(22) Filed: Mar. 7, 2013

(65) Prior Publication Data
US 2013/0188621 A1 Jul. 25, 2013

Related U.S. Application Data

(62) Division of application No. 11/680,455, filed on Feb. 28, 2007.

(51) Int. Cl.
*H04W 8/00* (2009.01)
*H04W 48/18* (2009.01)
*H04W 48/12* (2009.01)
*H04W 92/20* (2009.01)
*H04W 52/02* (2009.01)

(52) U.S. Cl.
CPC .............. *H04W 8/005* (2013.01); *H04W 48/12* (2013.01); *H04W 48/18* (2013.01); *H04W 92/20* (2013.01); *H04W 52/0216* (2013.01)
USPC ........................................................ 370/336

(58) Field of Classification Search
CPC ..... H04W 8/005; H04W 48/18; H04W 48/12; H04W 92/20; H04W 52/0216
See application file for complete search history.

(56) References Cited

U.S. PATENT DOCUMENTS 7,286,515 B2   10/2007  Olson et al.
7,468,966 B2   12/2008  Baker et al.
(Continued)

FOREIGN PATENT DOCUMENTS

WO   2006087677 A1   8/2006
WO   2006138326 A1   12/2006

OTHER PUBLICATIONS

International Search Report-PCT/US2008/054457, International Searching Authority-European Patent Office-Oct. 15, 2008.
(Continued)

*Primary Examiner* — Clemence Han
(74) *Attorney, Agent, or Firm* — QUALCOMM IP Department; James Hunt Yancey, Jr.

(57) ABSTRACT

Beacons may be grouped to facilitate neighbor discovery in a wireless network. For example, neighboring access devices such as IEEE 802.11 access points may cooperate to transmit beacons in a group. In this way, a wireless device seeking to discover the neighboring access devices may scan for the beacons for a shorter period of time. An indication may be provided to enable a wireless device to more efficiently scan the beacons. For example, the indication may indicate the channel the wireless device should scan to receive the next beacon that is to be transmitted. In addition, the indication may include information relating to the transmission time of the next beacon. Other aspects, embodiments, and features are also claimed and described.

23 Claims, 9 Drawing Sheets

(56) References Cited

U.S. PATENT DOCUMENTS

| | | |
|---|---|---|
| 7,564,826 B2 | 7/2009 | Sherman et al. |
| 7,650,150 B1 | 1/2010 | Gerakoulis et al. |
| 7,675,878 B2 | 3/2010 | Simpson et al. |
| 2005/0090264 A1 | 4/2005 | Kim |
| 2006/0040701 A1 | 2/2006 | Long et al. |
| 2006/0089964 A1 | 4/2006 | Pandey et al. |
| 2006/0111103 A1 | 5/2006 | Jeong et al. |
| 2006/0135068 A1 | 6/2006 | Jaakkola et al. |
| 2006/0171304 A1 | 8/2006 | Hill et al. |
| 2006/0198337 A1 | 9/2006 | Hoang et al. |
| 2007/0014269 A1* | 1/2007 | Sherman et al. ............. 370/338 |
| 2007/0064655 A1 | 3/2007 | Ruuska |
| 2007/0140163 A1 | 6/2007 | Meier et al. |
| 2008/0002633 A1* | 1/2008 | Pandey et al. ................. 370/338 |
| 2008/0186917 A1 | 8/2008 | Wu et al. |
| 2008/0205340 A1 | 8/2008 | Meylan et al. |
| 2010/0296495 A1* | 11/2010 | Iino et al. ...................... 370/338 |
| 2011/0149867 A1* | 6/2011 | Rudolf et al. ................. 370/328 |

OTHER PUBLICATIONS

Pack, et al.: "Fast-Handoff Support in IEEE 802.11 Wireless Networks," IEEE Communications Surveys & Tutorials, vol. 9, Issue 1, pp. 2-12, First Quarter 2007.
Taiwan Search Report—TW097106889—TIPO—Jun. 1, 2012.
Written Opinion-PCT/US2008/054457, International Searching Authority-European Patent Office-Oct. 15, 2008.

\* cited by examiner

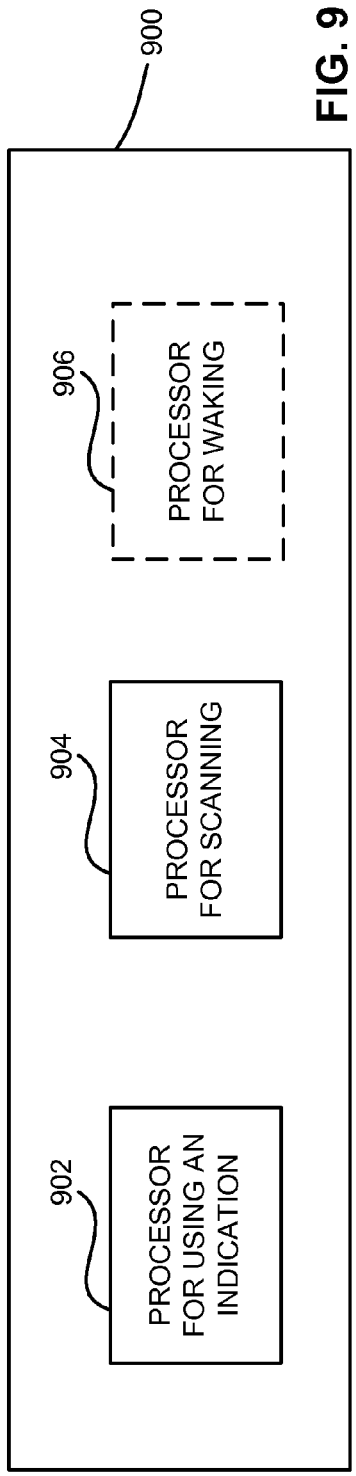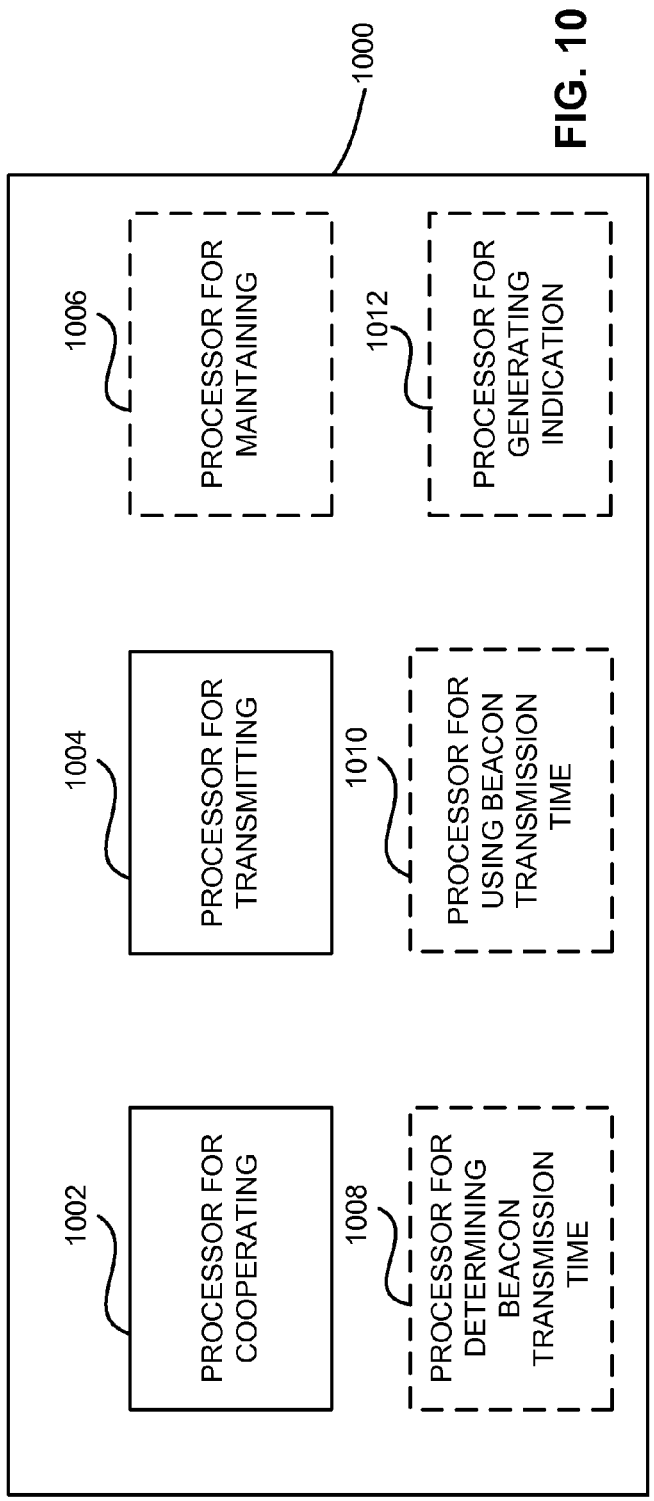

NEIGHBOR DISCOVERY IN A WIRELESS SYSTEM

PRIORITY CLAIM

The present application for patent is a divisional application of patent application Ser. No. 11/680,455, entitled "NEIGHBOR DISCOVERY IN A WIRELESS SYSTEM" filed Feb. 28, 2007, assigned to the assignee hereof and expressly incorporated herein by reference as if fully set forth below.

TECHNICAL FIELD

The technology discussed in this application relates generally to communications, and more specifically, to discovering neighboring devices in a wireless system.

BACKGROUND

A wireless local area network ("WLAN") such as an IEEE 802.11-based network enables wireless devices within the coverage area of the network to communicate with one another and, typically, with other devices that are coupled to another network. For example, an 802.11-based access point may include a radio for communicating with mobile stations within its coverage area and also some form of connection to another network (e.g., a wide area network such as the Internet).

In some applications several WLANs may be deployed as neighboring networks to provide a wider collective coverage area. For example, in an enterprise deployment several access points may be located throughout the facility (e.g., a building or campus) such that the coverage areas of adjacent access points overlap to some extent. In this way, a mobile station may maintain local area network connectivity as it roams through the enterprise facility. That is, as the wireless station moves from the coverage area of one WLAN to the coverage area of another WLAN the station may disassociate from the first WLAN and associate with the second WLAN.

Here, provisions may be made to provide a station with information regarding WLANs in the immediate vicinity to enable the station to efficiently roam between neighboring WLANs. For example, a station may continually monitor the signal strength of signals received from nearby WLANs. In this way, the station may determine which WLAN provides the best connectivity at a given geographical location. A station may thereby elect to switch from one WLAN to another in an attempt to maintain a high quality of service.

The 802.11 standard defines both active and passive techniques for a station to acquire information regarding neighboring WLANs. For example, a station may actively scan the 802.11 channels by successively sending a probe request over each channel and waiting for a probe response from any nearby access points operating on that channel. The station may thereby obtain information regarding neighboring WLANs via information provided in the probe responses. A station utilizing active scanning, however, expends power and increases the load on the wireless channel by repeatedly transmitting probes. In addition, in some areas (e.g., different countries) a station may not be authorized to transmit probes on certain channels. Hence, additional provisions may need to be taken to avoid potential regulatory issues associated with active scanning.

Alternatively, a station may passively scan for traffic on each of the 802.11 channels to determine whether there are any nearby WLANs. To determine more information about any access points deployed in a given channel, the station may scan for beacons transmitted by each access point. In some applications, however, an access point may have a relatively long beacon interval (e.g., on the order of a second). Hence, a station may expend a considerable amount of power scanning for beacons for relatively long periods of time on each channel. Moreover, in the event the station is associated with an access point on a given channel, data transmissions between the station and the access point may be adversely affected when the station is scanning on other channels.

To improve the efficiency of active or passive scanning operations, 802.11 specifies a technique for providing a list of neighboring access points to any stations in the immediate area. For example, an access point may send a neighbor report to each of its associated stations. The neighbor report may include the list of neighboring access points, the channel employed by each access point, the beacon interval for each access point, the time synchronization function ("TSF") offset for each access point, and other information.

Through the use of such information, a station may more efficiently scan for beacons from each of the neighboring access points. Specifically, a station may determine when and on which channels the beacons will be sent. Consequently, the station may not need to passively scan for long periods of time or employ active scanning to acquire information (e.g., associated signal strength) relating to neighboring access points.

In practice, the target beacon transmit times ("TBTTs") of the various access points in a basic service set affect how quickly a station may acquire information about the neighboring access points on the various channels. For example, if beacons are sent at substantially the same time on two or more different channels, the station may need to wait several more TBTTs before it can decode all of the beacons of the neighboring access points.

BRIEF SUMMARY OF SOME SAMPLE EMBODIMENTS

A summary of sample aspects of the disclosure follows. For convenience, one or more of such aspects may be referred to herein simply as "some aspects."

The disclosure relates in some aspects to techniques for facilitating roaming between neighboring wireless local area networks ("WLANs"). For example, various techniques are disclosed relating to enabling a wireless device to efficiently scan for beacons from neighboring access devices.

In some aspects neighboring access devices (e.g., access points such as 802.11-based access points) cooperate to transmit beacons. For example, beacons from different access points may be transmitted in a consecutive, non-overlapping order. Moreover, a known spacing may be defined between successive beacon transmissions such that all of the beacons in a given set of beacons are transmitted in a grouped manner over a relatively short period of time. As an example, a first access point may transmit its beacon at a defined time, and a second access point may transmit its beacon a defined amount of time following the beacon of the first access point, where the defined amount of time is relatively short.

Through the use of such a beacon transmission scheme, a wireless device (e.g., an 802.11-based station) synchronized with the system and aware of the transmission times of the beacons may efficiently scan for them. For example, the station may wake from a power save mode to scan for the group of beacons then return to the power save mode once all of the beacons in the group have been received. Given that the beacons may be spaced closely together in time, the scan time of the wireless device may be reduced in comparison to conventional scanning techniques. Consequently, the station may increase the amount of time it spends in power save mode, thereby increasing the standby time of the station.

In some aspects provisions may be made to enable a wireless device (e.g., an 802.11-based station) to determine which channel should be scanned and when the channel should be scanned to receive the next beacon. For example, an access point or some other device that has information regarding the deployed channels and the beacon timing of the neighboring access points may send an indication (e.g., in a beacon) including this information to its associated stations. In some aspects the indication comprises a function that identifies a channel to be scanned (and, optionally, a scan time) based on the previous channel that was scanned. In some aspects an indication may identify unused channels. A station may then use this information to avoid scanning those channels.

In some aspects a method of using beacon-related information comprises using, by a wireless device, an indication regarding transmission of at least one next beacon by at least one neighboring access point, wherein each beacon of the at least one next beacon comprises an identifier of an associated wireless network; and scanning, by the wireless device, for the at least one next beacon.

In some aspects an apparatus for using beacon-related information comprises a scan controller adapted to use an indication regarding transmission of at least one next beacon by at least one neighboring access point, wherein each beacon of the at least one next beacon comprises an identifier of an associated wireless network; and a scanner adapted to scan for the at least one next beacon.

In some aspects an apparatus for using beacon-related information comprises means for using an indication regarding transmission of at least one next beacon by at least one neighboring access point, wherein each beacon of the at least one next beacon comprises an identifier of an associated wireless network; and means for scanning for the at least one next beacon.

In some aspects a computer program product comprising computer-readable medium comprises code for causing at least one computer to use an indication regarding transmission of at least one next beacon by at least one neighboring access point, wherein each beacon of the at least one next beacon comprises an identifier of an associated wireless network; and code for causing the at least one computer to scan for the at least one next beacon.

In some aspects a method of providing beacons by an access point comprises cooperating, with at least one other access point, to determine when to transmit beacons of associated time division multiplexed wireless networks, wherein each beacon comprises an identifier of one of the time division multiplexed wireless networks; and transmitting the beacons of at least one of the networks.

In some aspects an access point apparatus for providing beacons comprises a controller adapted to cooperate, with at least one other access point, to determine when to transmit beacons of associated time division multiplexed wireless networks, wherein each beacon comprises an identifier of one of the time division multiplexed wireless networks; and at least one transmitter for transmitting the beacons of at least one of the networks.

In some aspects an access point apparatus for providing beacons comprises means for cooperating, with at least one other access point, to determine when to transmit beacons of associated time division multiplexed wireless networks, wherein each beacon comprises an identifier of one of the time division multiplexed wireless networks; and means for transmitting the beacons of at least one of the networks.

In some aspects a computer program product for an access point comprises code for causing at least one computer to cooperate, with at least one other access point, to determine when to transmit beacons of associated time division multiplexed wireless networks, wherein each beacon comprises an identifier of one of the time division multiplexed wireless networks; and code for causing the at least one computer to transmit the beacons of at least one of the networks.

BRIEF DESCRIPTION OF THE DRAWINGS

These and other features, aspects and advantages of the disclosure will be more fully understood when considered with respect to the following detailed description, appended claims and accompanying drawings, wherein:

FIG. 9 is a simplified block diagram of several sample aspects of a wireless device; and FIG. 10 is a simplified block diagram of several sample aspects of an access device.

Figure 1:
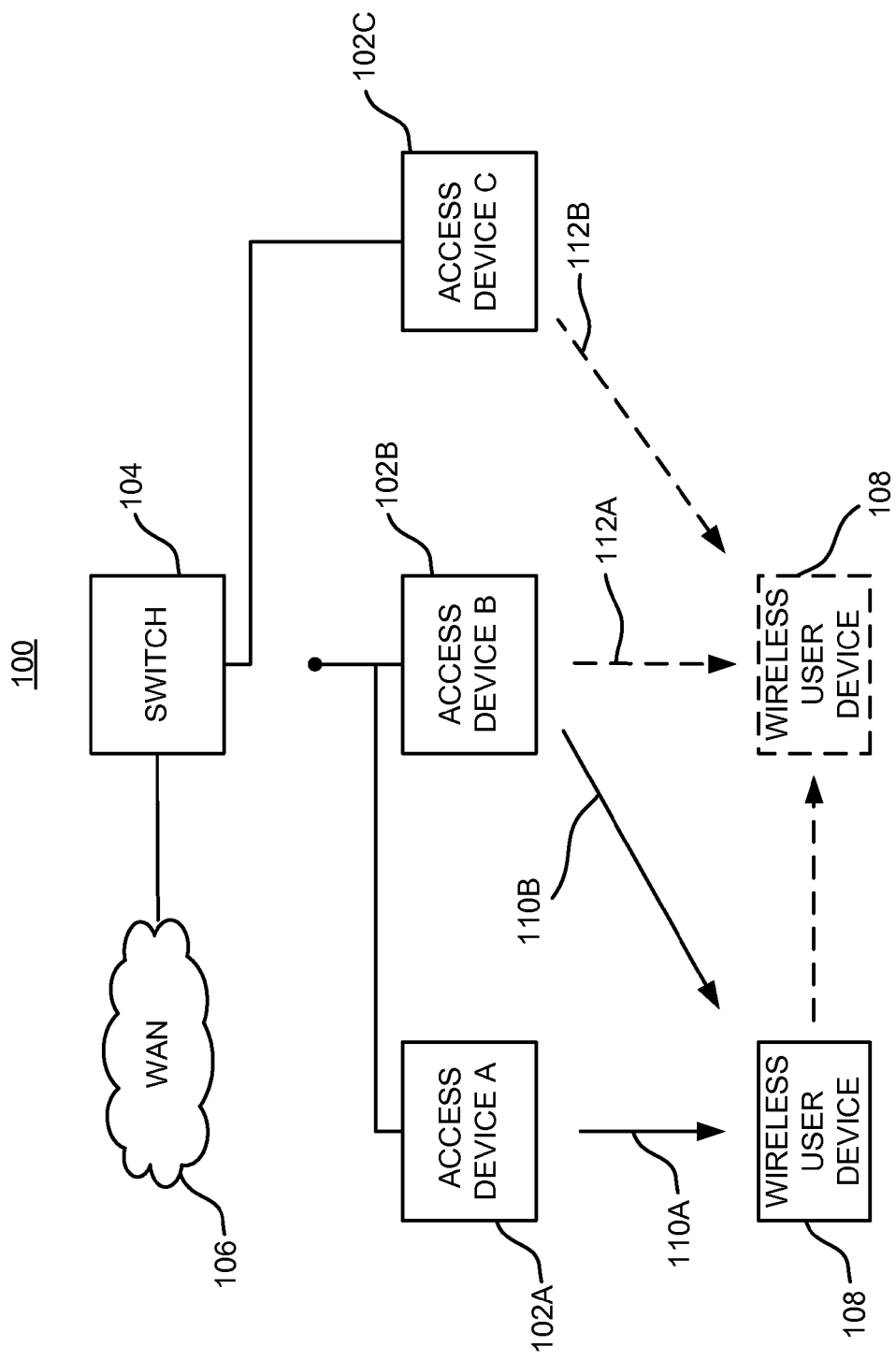
FIG. 1 is a simplified block diagram of several sample aspects of a communication system employing access devices and wireless user devices.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

FIG. 1 illustrates sample aspects of a communication system 100 providing WLAN coverage via several neighboring access devices (e.g., access points) 102A, 102B, and 102C.

The access devices 102A-C are coupled to a switch 104 that provides connectivity to a wide area network ("WAN") 106 such as the Internet.

Each of the access devices 102A-C provides wireless connectivity via a time division multiplexed network for wireless devices (e.g., user devices) within the coverage area (not shown) of that access device. The access devices 102A-C thus collectively provide the overall WLAN coverage area of the system 100. For example, a wireless device 108 at the location represented by the solid box may be within the coverage areas of access devices 102A and 102B. Thus, the wireless device 108 may receive beacons from each of the access devices 102A and 102B as represented by the lines 110A and 110B. As a wireless device 108 roams from the location represented by the solid box to the location represented by the dashed box, the wireless device 108 enters the coverage area of access device 102C and exits the coverage area of access device 102A. Thus, the wireless device 108 may now receive beacons from the access devices 102B and 102C as represented by the dashed lines 112A and 112B.

As the wireless device 108 roams through the overall WLAN coverage area provided by the system 100, the wireless device 108 may determine which access device currently provides the best connectivity for the wireless device 108. For example, the wireless device 108 may repeatedly scan for beacons from nearby access points and measure the signal strength (e.g., power) associated with each of the beacons. The wireless device 108 may thus elect to associate with the access point that currently provides optimum connectivity as indicated by maximum received beacon signal strength. The wireless device 108 may utilize other criteria relating to optimum connectivity. For example, optimum connectivity may be associated with a more desirable service (e.g., different content or data rates).

The wireless device 108 may continue to scan for beacons on a regular (e.g., periodic) basis to determine when to disassociate with one access device and associate with another access device. For example, at some point in time another wireless device may provide better connectivity for the wireless device 108 as it continues to roam through the overall WLAN coverage area. In addition, signal conditions or services provided within a given WLAN coverage area may change over time.

The access devices 102A-C and the wireless device 108 may take various forms depending on the requirements of a given application. For example, a user device may comprise a cellular phone, a smart phone, a cordless phone, a laptop computer, a PDA, a wireless modem, a mobile device, a handset, a handheld device, a satellite radio, a global positioning system, or some other communication device. A user device also may be referred to as user equipment, an access terminal, a station, a wireless communication device, a terminal, a user terminal, mobile equipment, a subscriber unit, or described using some other terminology. Similarly, an access device may take any suitable form that facilitates providing access to such wireless devices.

Several techniques that may be used to enable a wireless device to more efficiently scan for beacons will now be discussed in conjunction with FIG. 2. For convenience, the operations of FIG. 2 (and any other flowchart herein) may be described in conjunction with specific components (e.g., the components of FIG. 1). It should be appreciated, however, that these operations may be performed in conjunction with other components.

As represented by block 202 the access devices in a given geographical area (e.g., neighboring access points) may cooperate (e.g., over a wireless medium or over a wired network) to select their respective beacon transmission schedules. For example, the transmission times of the beacons may be selected such that the beacons are transmitted in groups.

Figure 3:
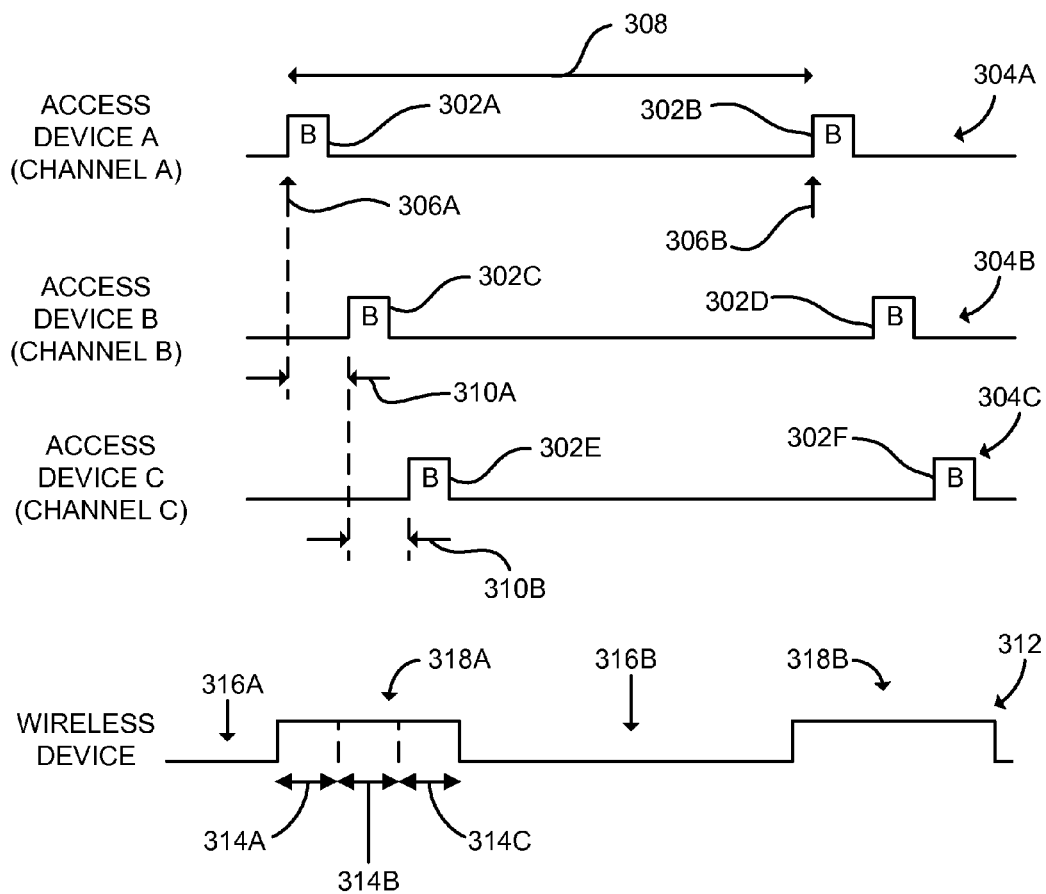
FIG. 3 is a simplified diagram of several sample timing diagrams illustrating beacon transmission and scanning.

FIG. 3 illustrates, in a simplified manner, sample groupings of beacons 302A-F from three access devices. Here, a timing diagram 304A represents beacon transmissions from an access device A via a first channel (designated as channel A). A timing diagram 304B represents beacon transmissions from an access device B via a second channel (channel B). A timing diagram 304C represents beacon transmissions from an access device C via a third channel (channel C).

Arrows 306A and 306B represent the target beacon transmit times ("TBTTs") for access device A. In practice, beacons may not always be transmitted at the TBTTs due to, for example, the presence of other traffic on the channel. To reduce the complexity of FIG. 3, TBTT arrows are not depicted for timing diagrams 304B and 304C.

An arrow 308 represents the designated time between successive beacons for a given access device, commonly referred to as the beacon interval. In the example of FIG. 3, the access devices A-C utilize beacon intervals of the same length. It should be appreciated, however, that different access devices may employ beacon intervals of differing lengths. For convenience, the length of each beacon 302A-F is shown as being relatively long as compared to the length of the beacon interval. In practice, however, the beacon interval may be significantly longer that the transmission time of a beacon.

In FIG. 3 the beacons transmission times are defined such that for every beacon interval a group of beacons includes one beacon from each access device. Specifically, one group of beacons consists of the beacons 302A, 302C, and 302E and another group of beacons consists of the beacons 302B, 302D, and 302F. Here, it may be seen that the access devices may transmit the beacons in a given group of beacons (e.g., beacons 302A, 302C, and 302E) in a consecutive, non-overlapping order.

FIG. 3 also illustrates that all of the beacons in a given group may be transmitted over a relatively short period of time. For example, a relatively short spacing may be defined between successive beacon transmissions. In the example of FIG. 3, spacings 310A and 310B are defined as the time between the TBTTs of the different access devices. It should be appreciated, however, that the spacing may be defined in other ways. For example, the spacing may be defined as the time period between the end of one beacon and the beginning of another beacon.

The length of the defined (e.g., known) spacing between beacons may depend on various factors. In an implementation where successive beacons in a group are transmitted over different channels (e.g., as in the example of FIG. 3), the spacing between beacons may be longer than the channel switching time (e.g., on the order of 1 millisecond) of a radio of a wireless device that is adapted to receive the beacons. For example, in this case a spacing defined as the time between the end of one beacon and the beginning of the next beacon would be set to be longer than the switching time. In contrast, in an implementation where successive beacons in a group are transmitted over the same channel, a shorter spacing may be employed since the radio of the wireless device will not need to switch to another channel to scan for the next beacon.

Various techniques may be employed to define the grouping and timing of beacons for neighboring access devices. In some implementations a switch or other suitable device (e.g., switch 104 in FIG. 1) may determine the beacons schedules for a set of neighboring access devices. For example, the switch 104 may define the TBTTs for each access device to provide a desired grouping of and spacing between the beacons. In addition, the TBTTs may be assigned to the neighboring access devices to define a desired beacon transmission order. That is, the TBTTs may be used to control which access device transmits the first beacon, which access device transmits the second beacon, and so forth. The switch 104 may then send messages to each access device to inform the access devices of the presence of neighboring access devices and the corresponding beacon schedules. A synchronization protocol may be operated on the wired network between the switch and the access devices to give them a common time reference as described below.

In some aspects neighboring access devices may cooperate with one another to define their beacon schedules. For example, one or more of the access devices may send messages to the other access devices to inform the access devices of the presence of neighboring access devices. The neighboring access devices may then negotiate to select the channel(s) and/or beacon transmission time(s) to be used by each access device.

Provisions also may be made to ensure that each access device continues to transmit its beacons at the proper time. For example, the relative timing of the access devices may be synchronized on a regular basis over the air or over the wired network to compensate for problems such as clock drift or slightly different access device clock frequencies that may otherwise cause the relative timing of the beacon transmission to change over time. In this way, relatively constant time synchronization function ("TSF") offsets may be maintained between the neighboring access devices.

In some aspects one access device may be designated as a primary access device upon which the timing of the other neighboring access devices depends. For example, the first access device to be activated in a given geographical area may be designated as the primary access device, and a suitable TBTT and beacon interval assigned to that access device. The timing of any access devices subsequently activated in that geographical area may then be based on (e.g., synchronized to) the first access device.

Referring again to FIG. 2, as represented by block 204 an indication regarding the beacon transmission schedules may be provided to any wireless device that may receive beacons from any of the access devices. Such an indication may include, for example, information relating to the channels to be scanned, information relating to times at which scanning should commence, or both. In some aspects the indication may identify one or more channels that are not currently being used by any of the neighboring access points (e.g., to the extent this is known by a coordinating access point that generates the indication).

In the example of FIG. 3, an indication may indicate that one access device operates on channel A, another operates on channel B, and another operates on channel C. The indication also may indicate the order the channels should be scanned (e.g., channel A, then B, then C). In addition, or in the alternative, the indication may indicate that one or more channels (e.g., channels D-G) are not currently being used by any neighboring access device.

Furthermore, the indication may indicate when a given channel may be scanned. The timing aspect of the indication may include, for example, a set of (e.g., one or more of) a reference to a TBTT, a beacon interval, a TSF offset, a defined spacing (e.g., time delay) between beacons, some other suitable timing information, or some combination of these parameters.

In some aspects the indication may comprise or relate to a function that provides beacon-related information. For example, a wireless device may use such a function to determine, based on one or more input parameters, the beacon transmission parameters (e.g., channel and/or timing) of the next beacon or beacons that will be transmitted. The input parameters may include, for example, the beacon transmission parameters of the last beacon that was received, the current time, some other suitable parameter, or some combination of these parameters.

Table 1 illustrates an example of a function that may be used to derive beacon transmission information. The function identifies the next channel to be scanned based on the previous channel that was scanned (or the current channel being scanned). In Table 1 the next channel information is in the second column while the previous channel information is in the first column. In addition, the function identifies the time to scan the next beacon. In this example the timing is made with respect to the timing of the previous (or current) beacon. Specifically, in the third column of Table 1 scanning for the beacon on channel B or C may commence one beacon spacing (e.g., the spacing between beacons 302A and 302C in FIG. 3) after the end of the current beacon (the beacon of channel A or B, respectively). In addition, scanning for the beacon on channel A may commence a time period after the end of the current beacon (the beacon of channel C), where the time period is equal to the beacon interval (e.g., interval 308) minus three beacon length times (e.g., lengths of beacons 302A, 302C, and 302E).

TABLE 1

| | FUNCTION | |
|---|---|---|
| | NEXT BEACON INFORMATION | |
| PREVIOUS CHANNEL | NEXT CHANNEL | TIME TO NEXT BEACON |
| A | B | +BEACON SPACING |
| B | C | +BEACON SPACING |
| C | A | BEACON INTERVAL - 3 * BEACON LENGTHS |

Figure 4:
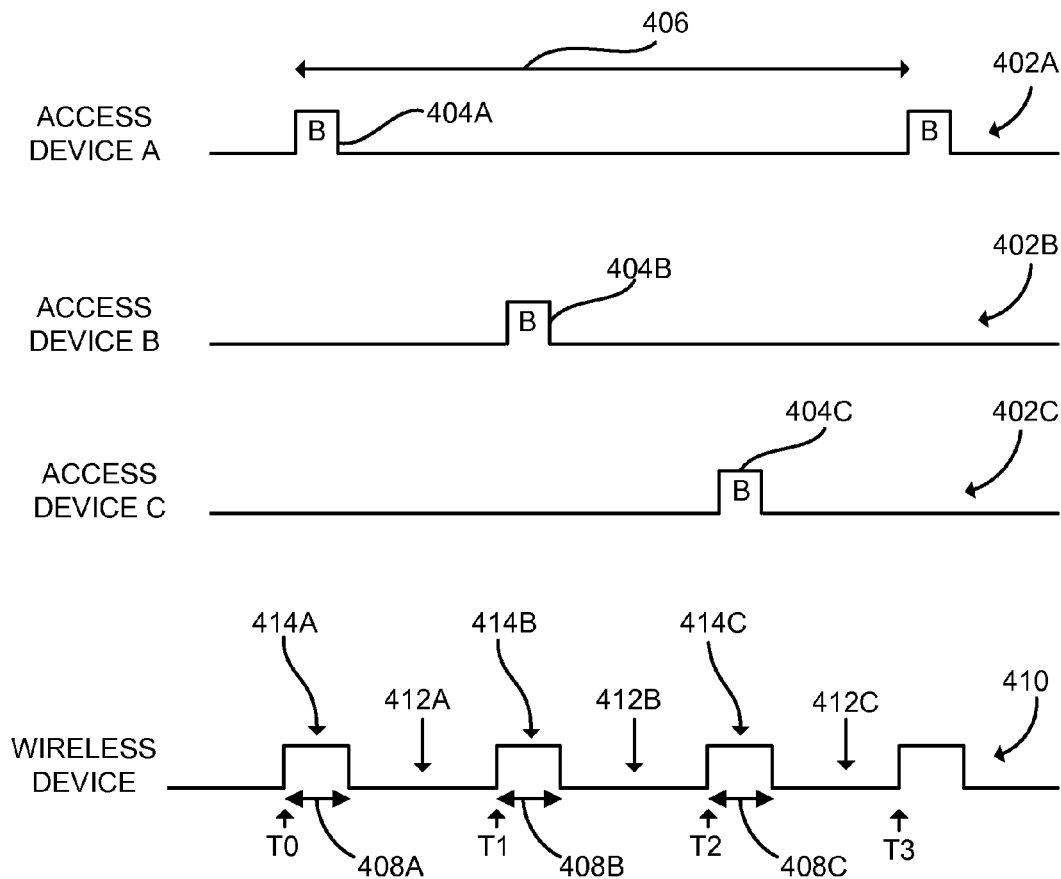
FIG. 4 is a simplified diagram of several sample timing diagrams illustrating beacon transmission and scanning.

In some aspects the indication may comprise or relate to a function that provides only beacon timing-related information. For example, referring to FIG. 4 and Table 2, in some implementations multiple access devices may utilize a common channel. Here, timing diagrams 402A, 402B and 402C represent beacon transmissions from access devices A, B, and C, respectively over a given channel. Specifically, access device A transmits beacon 404A shortly after time T0, access device B transmits beacon 404B shortly after time T1, and access device C transmits beacon 404C shortly after time T2. In the example of FIG. 4, the beacons 404A, 404B, and 404C are transmitted during a single beacon interval 406.

The function of Table 2 may be used identify the time for scanning the next beacon based on the beacon that is currently being scanned or the beacon that was last scanned. For example, in Table 2 if the current beacon is for access device A, the next time to scan (for the beacon of access device B) is time T1.

TABLE 2

| FUNCTION | |
|---|---|
| PREVIOUS BEACON ACCESS DEVICE | TIME TO WAKE |
| A | T1 |
| B | T2 |
| C | T3 |

It should be appreciated based on the above that an indication relating to the transmissions of beacons may take various forms and include various types of information. For example, in some aspects the functions described above also may utilize timing information relating to the transmission of the previous beacon to determine the channel(s) and/or timing for the next beacon(s). It should also be appreciated that grouping the beacons of a given channel may also prove useful for a station that does not utilize or know about the timing function described herein. For example, the higher concentration of beacons may, on average, reduce the beacon search time.

FIG. 4 illustrates that in some aspects the beacons may not be closely grouped together in time. Here, an advantage may still be achieved by simply maintaining a known timing of (e.g., known spacings between) the beacons since a wireless device need only scan at the defined times. It should be appreciated, however, that in some aspects closely grouped beacons may be employed in a system where two or more of the access devices utilize the same channel.

In some aspects the indication may specify which channel to scan but not specify a time to scan. In this case, a wireless device may simply scan for a beacon on a designated channel and, once the beacon is received, switch to the next designated channel. In a related manner the indication may simply identify any unused channels. Through the use of such an indication, the wireless device may identify any channels it does not need to scan. The above approaches may still provide an advantage over conventional systems since the wireless device need not blindly search all of the channels for beacons.

Provisions also may be made to account for changes in an indication for a given set of access points over time. Such a change may be due to a change in traffic or signal conditions, the reassignment of the channels or beacon transmission times used by a given access device, the addition or removal of an access device in a communication system, or some other circumstance. Consequently, the type of indication used in a given system and/or the content of the indication may be dynamically updated.

An indication may be provided to a wireless device in various ways. For example, in a typical implementation an access device or some other device may send an indication to a wireless device via a beacon or some other suitable signal. As an example of the latter case, when a wireless device associates with an access device, the access device may send a message including the indication to the wireless device. In addition, a station may send a message to an access point requesting the indication. In some implementations the indication may be programmed into the wireless device. For example, in implementations where the beacon transmission schedules are assigned in a relatively static manner, a user, a system administrator, a manufacturer, or some other entity may program the indication into the wireless device the first time the wireless device is activated. Such programming may be accomplished, for example, by using the functionality of the wireless device, a programming device, or both.

Referring again to FIG. 2, as represented by block 206 once the neighboring access devices are configured and operating, they will transmit their beacons according to their respective beacon schedules. Thus, in the example of FIG. 3, access device A will transmit its beacon, then after a delay equal to a defined time period, access device B will transmit its beacon, and so forth.

As represented by block 208, in concurrence with the operations of block 206, the wireless device may use the indication to efficiently scan for the beacons from the neighboring access devices. For example, rather than blindly scanning channels for beacons from access devices, the wireless device may use the indication to scan an appropriate channel at an appropriate time.

Referring again to FIG. 3, the timing diagram 312 represents timing that may be associated with a wireless device. Based on the indication (e.g., the function of Table 1) the wireless device may be configured to scan the channels in the appropriate order. Thus, in the example of FIG. 3, a wireless device may first scan channel A. After receiving the beacon from access device A, the wireless device may then scan channel B, and so forth.

Here, provisions may be made to account for any delay in the transmission of one or more beacons. For example, if the wireless device determines upon scanning a channel that a device other than the expected access device is current using the channel, the wireless device may continue to scan that channel until the access device is able to send its beacon over the channel. Alternatively, the wireless device may proceed with the scanning of the other channels then rescan the missed channel at a later time (e.g., during the next beacon interval). In the event the wireless device scans a beacon of an access device with which it is associated and the beacon indicates that there is downlink traffic available for the wireless device, the wireless device may attempt to receive the downlink traffic before continuing with the neighbor beacon scan operation.

Provisions also may be made to account for the circumstance where a wireless device is not within an effective coverage area of a neighboring access device. That is, in the event the wireless device cannot receive the beacon that will be transmitted next, the wireless device may still use the indication to determine the next beacon to be transmitted after that one (i.e., in the next, next beacon). In the example of Table 1, the access device may thus use the information in the table to skip a row.

Figure 2:
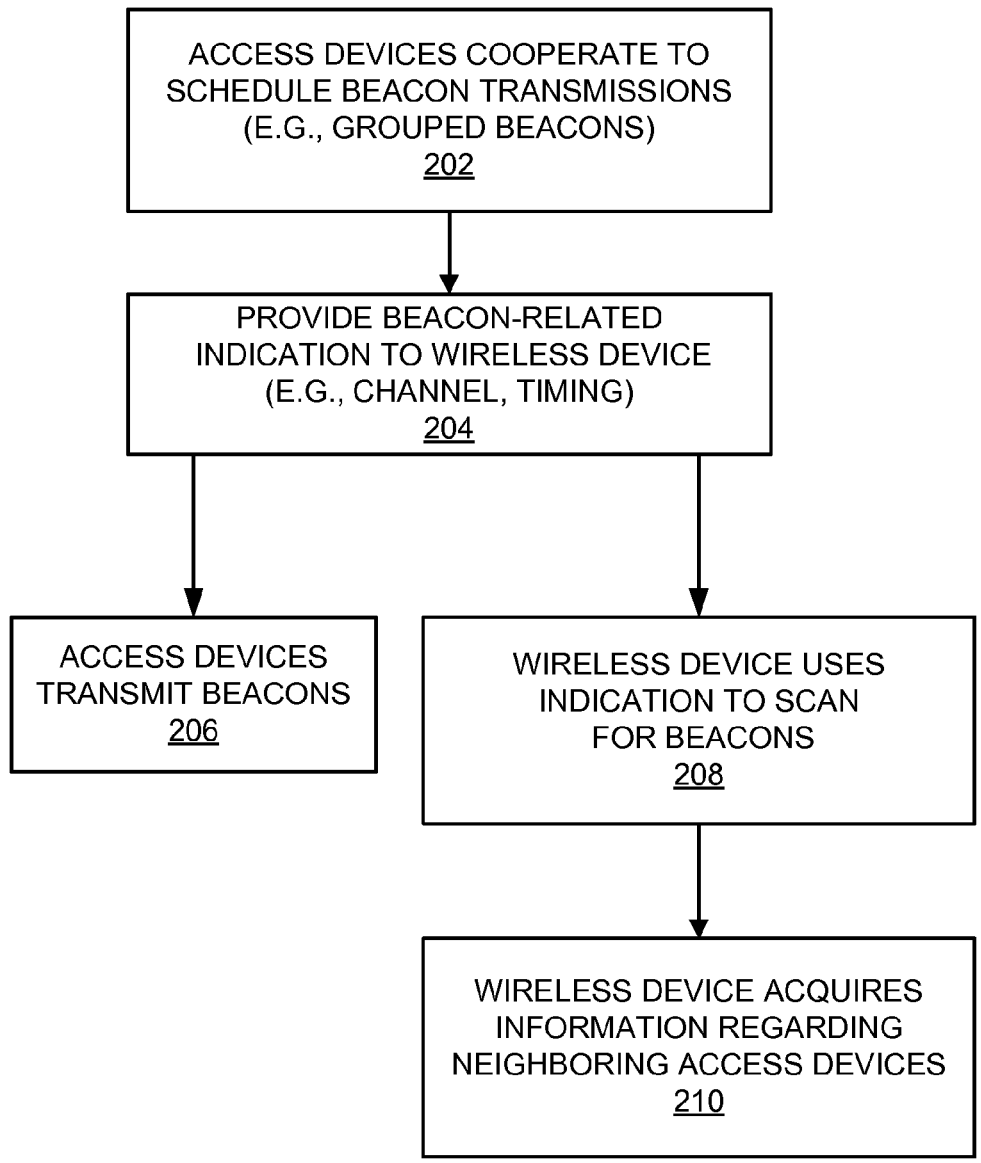
FIG. 2 is a flowchart of several sample aspects of operations that may be performed to obtain information about neighboring access devices.

At block 208 in FIG. 2 the wireless device also may use the indication to scan the channels at appropriate times. For example, referring to FIG. 3 the wireless device may scan channels A, B, and C over time intervals 314A, 314B, and 314C, respectively, based on the timing information in the indication (e.g., the third column of Table 1). Referring to FIG. 4 the wireless device may scan the channel over time intervals 408A, 408B, and 408C, respectively, associated with timing diagram 410 based on the timing information in the indication (e.g., Table 2). Here, it should be appreciated that the scanning time intervals 314A-C and 408A-C may take into account deviations in system timing, channel switching times, and other factors that may affect the precise timing of the beacons. For example, the time intervals 314A-C and 408A-C may be defined to start some time before an expected TBTT and commence some time after the time the beacon is expected to end.

FIGS. 3 and 4 illustrate that through the use of the indication, the wireless device may reduce the amount of time it is scanning for beacons from neighboring access devices. Here, by knowing where and when to scan, the wireless device may not need to scan for much more time than the cumulative lengths of the beacons. Consequently, power consumption associated with this scanning may be reduced in comparison with conventional scanning techniques. In addition, in the event the wireless device is associated with an access device on a given channel, the wireless device may remain on that channel for longer periods of time. Consequently, there may be a reduction in any negative impact on traffic to and from the wireless device that may otherwise result from lengthy scans on other channels.

The wireless device also may utilize the beacon-related indication to increase the amount of time the wireless device spends in a power save mode (e.g., an inactive state). For example, in the event the wireless device is not actively sending or receiving data, the wireless device may switch to a power save mode to reduce the amount of power that it consumes. However, it may be desirable for the wireless device to continue to acquire current information about nearby access devices so that the wireless device may readily associate with the best access device when it eventually needs to send or receive data.

Accordingly, the wireless device may use the indication to wake from the power save mode at the appropriate times to scan for beacons from neighboring access devices. Referring again to FIG. 3, the lower levels 316A and 316B of the timing diagram 312 represent the time the wireless device is in a power save mode (e.g., inactive state). Conversely, the higher levels 318A and 318B of the timing diagram 312 represent the time the wireless device is in an awake mode (e.g., active state). FIG. 4 includes similar lower levels 412A, 412B, and 412C representative of a power save mode and higher levels 414A, 414B, and 414C representative of an awake mode.

From FIGS. 3 and 4 it may be appreciated that in the absence of other traffic (e.g., normal beacon scanning or connection-related traffic) the wireless device may remain in power save mode except when it needs to scan for beacons from neighboring access devices. This is in contrast with conventional techniques where the wireless device may need to scan one or more channels for relatively long periods of time in an attempt to locate beacons on that channel or those channels. Consequently, a wireless device employing the teachings above may consume less power and, consequently, have a longer standby time than a wireless device employing conventional techniques.

Referring again to FIG. 2, as represented by block 210 the wireless device may use the information obtained from the beacons to determine which access device provides the best connectivity. As discussed above, this may involve analyzing the signal levels of the beacons to identify an access device associated with the best signal quality. In addition, the wireless device may analyze information contained in the beacons to determine whether a given access device provides more desirable services or quality of service.

It should be appreciated that various modifications may be made to the above examples consistent with the teachings herein. For example, in some aspects signals other than beacons may be used to provide the beacon-related functionality described herein. Thus, other types of signals that comprise an identifier of a network may be utilized to obtain information regarding neighboring access devices. Here, an identifier of a network may take various forms including, for example, an address such as a media access control ("MAC") address.

An apparatus or method involving the grouping of beacons or proving a beacon schedule indication may be implemented in a variety of ways. For convenience, additional details will now be described in the context of an 802.11-based system. It should be appreciated, however, that the teachings herein are not limited to this type of system or to the components and operations specifically set forth herein. For example, other protocols and techniques may be employed to group beacons or provide an indication as taught herein.

In an 802.11-based system, groups of devices cooperate to form basic service sets in an attempt to enable each group of devices to effectively communicate without substantial interference from neighboring groups of devices. For example, a first basic service set may be established on a particular wireless channel whereby all communications (e.g., data frames) include a basic service set identifier that uniquely defines that basic service set. Thus, a neighboring basic service set that operates on a different channel will not substantially interfere with the first basic service set due to the differing operating frequencies. Conversely, devices of a neighboring basic service set that operates on the same channel as the first basic service set will not process transmissions from the first basic service set because those devices use a different basic service set identifier.

A basic service set may be established in various ways. In a typical application an access point (e.g., that provides access to another network) establishes the basic service set and, to some extent, controls traffic flow over the basic service set. Here, the access point generates periodic beacons to enable a wireless station to locate the basic service set and to facilitate traffic control in the basic service set. For example, a wireless station entering the coverage area of an access point may scan for beacons, and then associate with the access point to join the basic service set. Once the station joins the basic service set, the access point may route data from the network to the station and route data from the station to the network.

In other applications a set of stations may cooperate to form a basic service set. For example, in an independent basic service set implementation (e.g., an ad hoc network) functionality that may otherwise be provided by an access point (e.g., generating beacons) may be implemented in and shared among several neighboring stations.

In an 802.11 implementation the access devices 102A-C of FIG. 1 may comprise access points ("APs") and the wireless device 108 may comprise a wireless station ("STA"). Here, each access point may establish a unique network defined by a unique basic service set identifier. Sample implementation details of these components will be discussed in conjunction with FIGS. 5, 6, 7, and 8.

Figure 5:
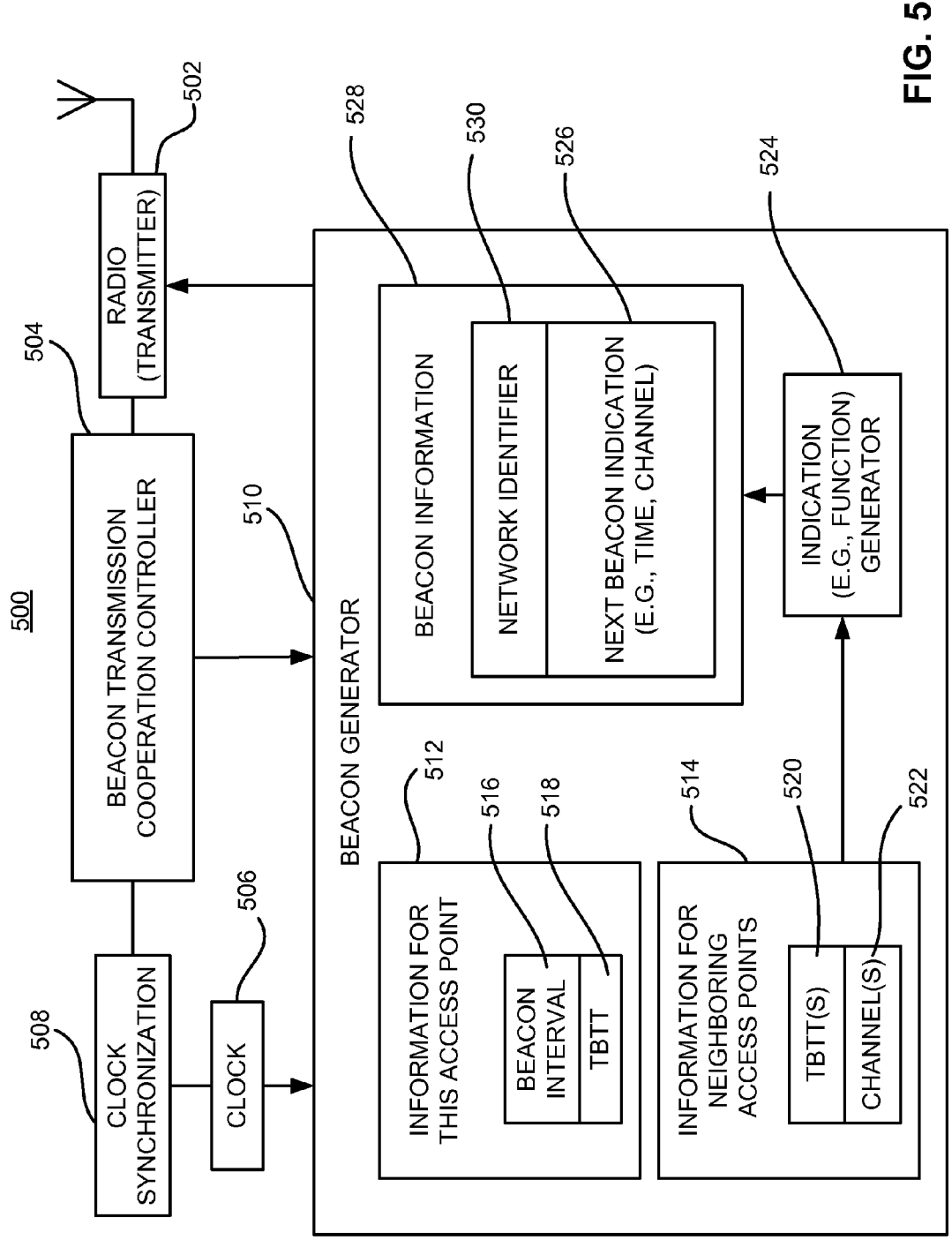
FIG. 5 is a simplified block diagram of several sample aspects of an access point.

FIG. 5 illustrates several sample aspects of an access point 500. Briefly, the access point 500 includes a radio 502 adapted to establish wireless communications with, for example, nearby stations. A beacon transmission cooperation controller 504 is adapted to communicate with a switch, other access points, or other devices to define a beacon transmission schedule. A clock 506 and a clock synchronization component 508 are adapted to provide clock signals for the access point 500 to facilitate precise timing of beacon transmissions and other operations. A beacon generator 510 is adapted to generate beacons in accordance with the beacon transmission schedule. To reduce the complexity of FIG. 5, other components commonly found in an access point are not shown.

Figure 6:
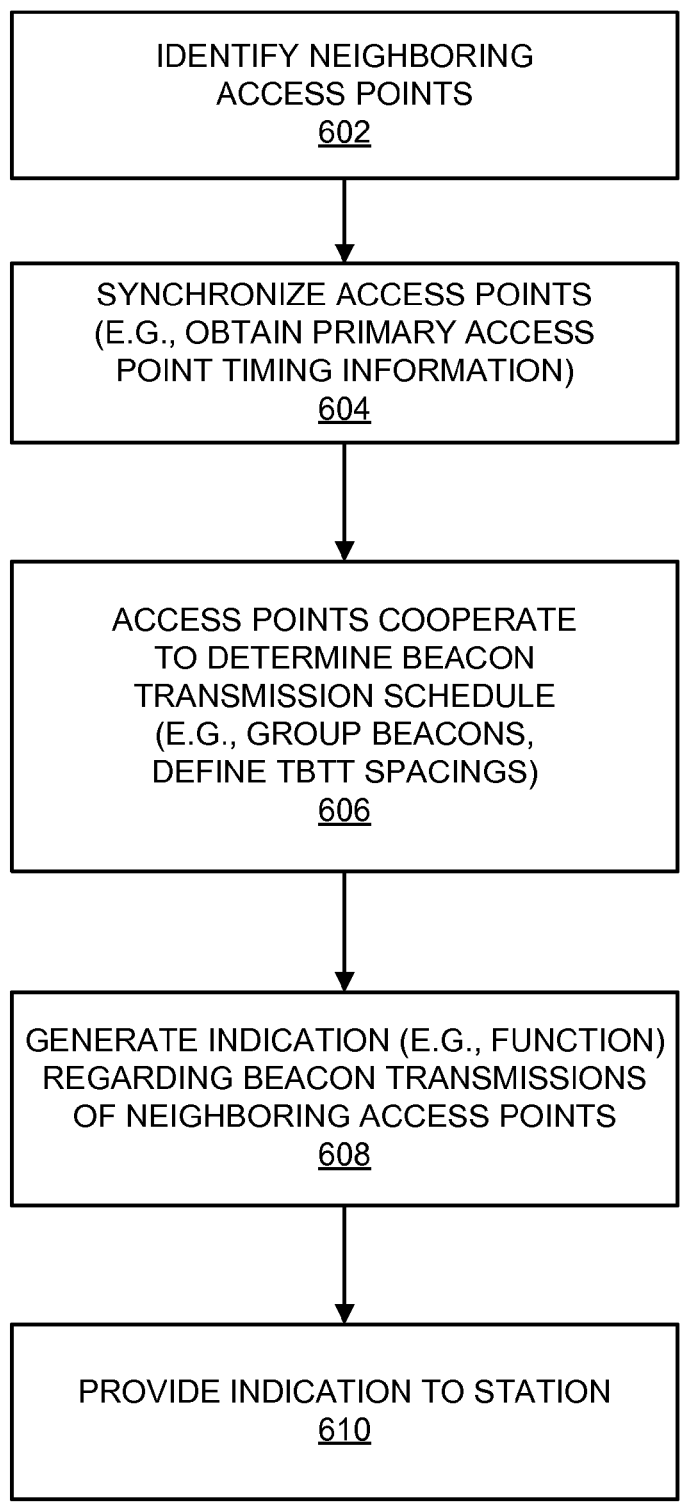
FIG. 6 is a flowchart of several sample aspects of operations that may be performed by an access point.

Sample operations of the access point 500 will be discussed in more detail in conjunction with the flowchart of FIG. 6. In particular, FIG. 6 relates to operations that may be performed to define a beacon transmission schedule and provide an indication regarding the beacon transmission schedule to nearby stations.

As represented by block 602, the access point 500 (e.g., the controller 504) may determine whether there are any neighboring access points. In a typical implementation, the controller 504 may obtain information regarding neighboring access points from a switch or other device with which each of the neighboring access points is associated. For example, a switch may maintain information indicating where the access points are located with respect to one another in a given geographical area. Then, based on this information, the switch may identify a given set of access points as being neighboring access points. Alternatively, in some implementations the access points may scan the wireless medium or communicate with one other to identify neighboring access points. In any event, it should be appreciated that a given communication system may employ one or more sets of neighboring access points.

As represented by block 604, the access point 500 may synchronize its timing with the timing of the neighboring access points. For example, as discussed above the access point 500 (e.g., the controller 504) may obtain timing information such as beacon timing information (e.g., TBTT and beacon interval) of a designated primary access point from the switch 104 (FIG. 1) or some other device. The clock synchronization component 508 may use this information or other suitable information to synchronize the clock 506 with the clock of the primary access point. As discussed above, operations such as these may be repeated on a regular basis to maintain synchronization over time.

As represented by block 606, the access point 500 (e.g., the controller 504) may cooperate with one or more neighboring access points to determine a beacon transmission schedule. For example, the controller 504 may communicate with a switch, an access point, some other device, or a combination of these devices to select channels for the access points, beacon transmission times, or both. As discussed above, this may involve defining TBTTs for each access point such that for a given beacon interval the beacons from the access points are transmitted in a group with a defined (e.g., known) spacing between subsequent beacons. To this end, the controller 504 may select beacon transmission times, send beacon transmission times to another device, receive beacon transmission times from another device, or perform some combination of these operations. As illustrated in FIG. 5, beacon-related information 512 for the access point 500 and beacon-related information 514 for neighboring access points may be stored in the access point 500 (e.g., in a data memory). The information 512 may include, for example, a beacon interval 516 and TBTT 518 of the access point. The information 514 may include, for example, one or more TBTTs 520 and one or more channels 522 used by the neighboring access points.

As represented by block 608, at some point an indication relating to the beacon transmission schedule is generated. In some aspects the access point 500 may generate the indication. For example, an indication generator 524 may use the information 512 and 514 to generate a next beacon indication 526 that may be included in beacon information 528 that the access point 500 transmits in each beacon. As discussed herein, the next beacon indication 526 may comprise information or a function indicative of the channel and/or the timing of one or more next beacons. FIG. 5 also illustrates that the beacon information 528 includes a network identifier 530 that may uniquely identify the wireless network provided by the access device 500. For example, in some implementations the network identifier 530 may comprise an address (e.g., a MAC address) or some other suitable information.

In some implementations the access point 500 may receive the indication from another device. In this case, the access point 500 may simply maintain the next beacon indication 526 (e.g., in a data memory) for subsequent transmission in its beacons.

As represented by block 610, at some point in time the indication is provided to any stations that may enter the coverage area of any one of the neighboring access points. Continuing with the example where the access point 500 supplies or maintains the indication, the access point 500 (e.g., a transmitter in the radio 502) sends the beacon or some other suitable signal including the next beacon indication 526 over its wireless network. In this way, any stations entering the coverage area of the access point 500 may receive the beacon or other signal and extract the indication 526 from the beacon.

Figure 7:
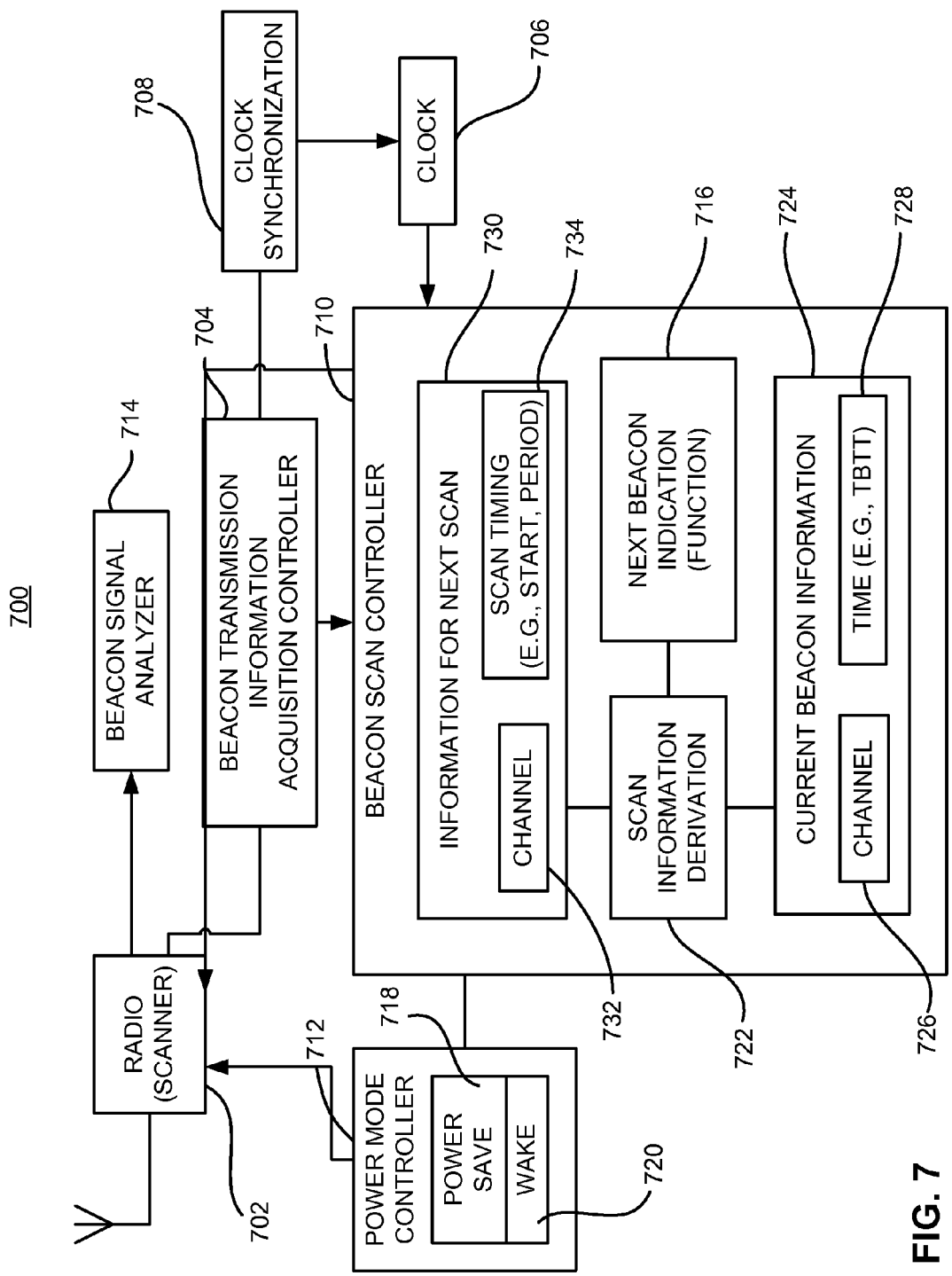
FIG. 7 is a simplified block diagram of several sample aspects of a wireless station.

FIG. 7 illustrates several sample aspects of a wireless station 700. Briefly, the station 700 includes a radio 702 adapted to establish wireless communications with, for example, nearby access points. A beacon transmission information acquisition controller 704 is adapted to communicate with an access point or some other device to obtain information relating to beacon transmissions. A clock 706 and a clock synchronization component 708 are adapted to provide clock signals for the station 700 to facilitate precise timing of reception of beacons and other operations. A beacon scan controller 710 is adapted to control the scanning for beacons. A power mode (e.g., state) controller 712 is adapted to control the mode of one or more components of the station 700. A beacon signal analyzer 714 is adapted to analyze received beacons or other signals. To reduce the complexity of FIG. 7, other components commonly found in a station are not shown.

Figure 8:
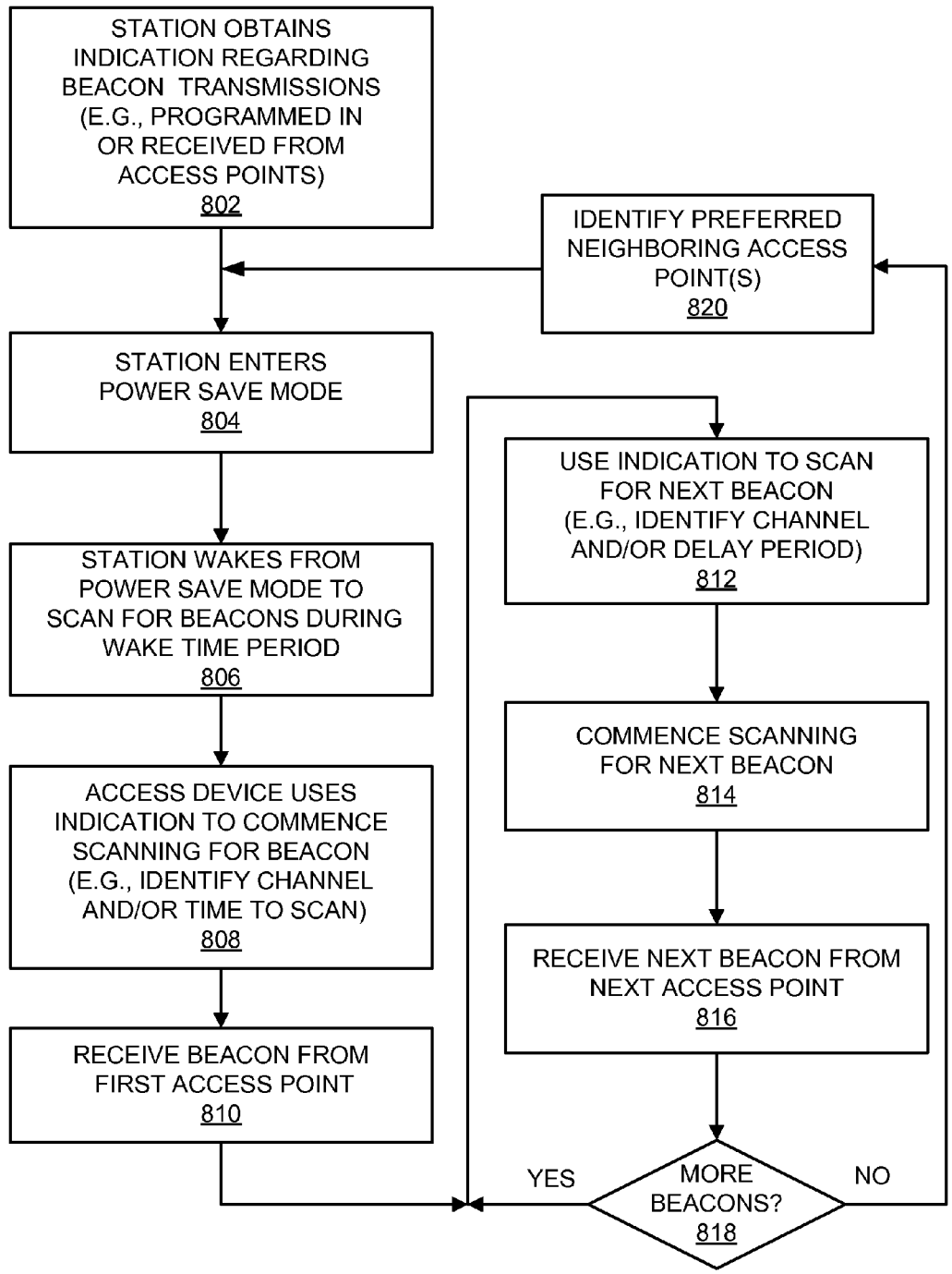
FIG. 8 is a flowchart of several sample aspects of operations that may be performed by a wireless station.

Sample operations of the station 700 will be discussed in more detail in conjunction with the flowchart of FIG. 8. In particular, FIG. 8 relates to operations that may be performed to obtain an indication relating to beacon transmission schedules and to receive beacons or other signals from one or more access points (e.g., neighboring access points).

As represented by block 802, the station 700 (e.g., the controller 704) may obtain an indication regarding beacon transmission schedules of neighboring access points. For example, the controller 704 may communicate with another device such as a programming device or an access point to receive a next beacon indication. In the latter case, a scanner in the radio 702 may scan for beacons from an associated access point or some other access point and provide the beacon information including a next beacon indication to the controller 704. The controller 704 may then store any received next beacon indication (e.g., a function as discussed herein) 716 in a data memory for later use by the beacon scan controller 710.

As represented by block 804, the station 700 may enter a power save mode to conserve power when it is not actively transmitting or receiving data. For example, the power mode controller 712 may set the station 700 to a power save mode (e.g., a suspended state) 718 or to a wake mode (e.g., an active state) 720. In some applications a power save mode may result in one or more of the components of the station 700 being temporarily disabled or turned off. Here, however, power may still be supplied to other components of the station 700. For example, to maintain state information during the power save mode, power may be supplied to at least a portion of data memory in the station 700. It should be appreciated that the power mode controller 712 may utilize other modes (states) in addition to or instead of one or more of the modes 718 and 720.

Various components may be controlled by the power mode controller 712. For example, in some aspects the power mode controller 712 may control one or more components associated with lower layer processing in the station (e.g., the radio 702). In other aspects the power mode controller 712 may control other components of the station 700.

As represented by block 806, the station 700 (e.g., under the control of the controller 712) may wake from the power save mode to scan for beacons during the wake time period.

As discussed above in conjunction with FIG. 3, the wake time period may correspond to the periods 318A and 318B. Thus, the wake time period may be defined based on the beacon transmission schedule information provided to the station 700 (e.g., the indication 716).

As represented by block 808, the station 700 (e.g., the beacon scan controller 710) uses the indication 716 to commence scanning for the first beacon (e.g., beacon 302A) in a given group of beacons (e.g., beacons 302A, 302C, and 302E). Here, the beacon scan controller 710 (e.g., a scan information derivation component 722) may determine which channel is to be scanned next and when scanning should commence on that channel based on current beacon information 724 maintained in the station 700. The information 724 may identify, for example, the last channel that was scanned 726 and/or timing associated with the last scan (e.g., the TBTT of the corresponding access point) 728. With reference to the beacon indication function of Table 1, the current channel information 726 may correspond to information for the first column in the table.

Based on the above, the derivation component 722 generates information 730 to be used for the next scan. Here, the information 730 may identify the next channel to be scanned 732 and the scan timing 734. With reference again to Table 1, the channel information 732 and the timing information 734 may correspond to the second and third columns, respectively, in the table. The timing information 734 may include information relating to the start of the scan and the length of the scan. As an example of the latter, information relating to the length of the beacons may be used to define how long the scanning should performed. With reference to FIG. 3, the scan period for the first beacon in the group may comprise the period 314A. The scanner of the radio 702 may thus be tuned to the appropriate channel and activated for the designate period of time to receive the beacon from the access point (block 810).

As represented by blocks 812-818, the station 700 then repeatedly scans for beacons from the other access points in the group. At block 812 the station again uses the indication in conjunction with the previous beacon information (e.g., relating to the first beacon in the group) to scan for the next beacon (e.g., the second beacon in the group). At block 814 the station commences scanning until the next beacon is received (block 816). As represented by block 818 these operations are repeated until all of the beacons in the group have been received. As illustrated in FIG. 3, these operations may be performed in a relatively short period of time (e.g., scan periods 314A-C) when the beacons are transmitted in a compact group. As a result, the station may expend less power for scanning operations, may not spend a significant amount of time scanning on other channels (e.g., other than the channel of an associated access point), and may remain in a power save state for longer periods of time.

As represented by block 820, as the station receives the beacons (at blocks 810 and 816) the beacon signal analyzer 714 may process each beacon and any information in the beacon to determine which access point provides the best current connectivity. For example, the beacon signal analyzer may measure signal strength associated with each beacon and select the access point that provides the beacon with the highest received signal strength as the preferred access point. The operations of FIG. 8 may then be repeated as necessary in an attempt to ensure that the station maintains a current list of the neighboring access points and information relating to the connectivity provided by those access points. The station may therefore easily and quickly transition to a different one of the neighboring access points as necessary to, for example, maintain an acceptable quality of service.

In view of the above, it may be appreciated that various advantages may be achieved in accordance with the teachings herein. For example, the standby time of a wireless local area network ("WLAN") device may be increased by grouping beacons and/or providing a beacon transmission indication to the device. Through the use of such techniques, the scan time of the WLAN device may be decreased and the amount of time spent in a power save mode may be increase, thereby increasing the standby time of the device.

The teachings herein are applicable to a variety of protocols, user devices and associated network components. Accordingly, a user device may incorporate various components to obtain connectivity to a network via various wireless platforms such as Wi-Fi (802.11-based), WiMAX, other time-division multiplexed networks, or any other suitable wireless platform. Moreover, this may be accomplished through the use of various architectures, protocols, specifications, or standards in addition to or other than those that have been specifically described.

The components described herein may be implemented in a variety of ways. For example, referring to FIG. 9, components 902, 904, and 906 may correspond at least in part to, for example, previously discussed components 710, 702, and 712, respectively. In some aspects these components may be incorporated in a component 900 that may correspond to, for example, component 700 in FIG. 7. Referring to FIG. 10, components 1002, 1004, 1006, 1008, 1010, and 1012 may correspond at least in part to, for example, previously discussed components 504, 502, 510, 504, 504, and 524, respectively. In some aspects these components may be incorporated in a component 1000 that may correspond to, for example, component 500 in FIG. 5. FIGS. 9 and 10 illustrate that in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

In addition, the components and functions represented by FIGS. 9 and 10, as well as other components and functions described herein, may be implemented using any suitable means. Such means also may be implemented, at least in part, using corresponding structure as taught herein. For example, in some aspects means for using an indication may comprise a scan controller, means for scanning may comprise a scanner, means for waking may comprise a mode controller, means for cooperating may comprise a beacon transmission cooperation controller, means for transmitting may comprise a transmitter, means for maintaining may comprise a beacon generator, means for determining beacon transmission time may comprise a beacon transmission cooperation controller, means for using beacon transmission time may comprise a beacon transmission cooperation controller, and means for generating an indication may comprise an indication generator. One or more of such means also may be implemented in accordance with one or more of the processor components of FIGS. 9 and 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of providing beacons by an access point, comprising:
    cooperating, with at least one other access point, to determine when to transmit beacons of associated time division multiplexed wireless networks, wherein each beacon comprises an identifier of one of the time division multiplexed wireless networks;
    maintaining at least one defined spacing between successive transmissions of the beacons; and
    transmitting the beacons of at least one of the networks.

2. The method of claim 1, wherein the access points transmit the beacons so that the beacons are not overlapping in time.

3. The method of claim 1, wherein all of the beacons, to be sent by the access points using a given channel, are sent consecutively in time.

4. The method of claim 1, wherein, when a next beacon and a previous beacon are sent on different channels, the at least one defined spacing is more than a channel switching time of a radio of a wireless device that is adapted to receive the next beacon and the previous beacon.

5. The method of claim 1, wherein the access points repetitively transmit a group of the beacons associated with at least a portion of the wireless networks;
    each beacon in the group of beacons is associated with a different one of the wireless networks; and
    the access points transmit the beacons in each group within a defined period of time.

6. The method of claim 5, wherein the defined period of time is less than a beacon interval.

7. The method of claim 1, wherein the access points cooperate to successively transmit, in turn, one of the beacons associated with each of the wireless networks.

8. The method of claim 1, wherein cooperating comprises establishing beacon transmission times to:
    reduce a total time used to transmit a set of non-time overlapping beacons; and
    provide reduced beacon scan time and total search time for a wireless device that is adapted to receive the beacons.

9. The method of claim 1, further comprising:
    determining a beacon transmission time of one of the access points; and
    using the beacon transmission time to establish target beacon transmit times for a set of the access points in a given geographical area.

10. The method of claim 1, further comprising generating an indication regarding transmission of at least one next beacon by the at least one other access point.

11. The method of claim 10, wherein the indication identifies at least one channel or at least one time upon which the at least one next beacon will be transmitted.

12. An access point apparatus for providing beacons, comprising:

a controller adapted to cooperate, with at least one other access point, to determine when to transmit beacons of associated time division multiplexed wireless networks, and to maintain at least one defined spacing between successive transmissions of the beacons, wherein each beacon comprises an identifier of one of the time division multiplexed wireless networks; and a transmitter for transmitting the beacons of at least one of the networks.

13. The apparatus of claim 12, wherein the access points transmit the beacons so that the beacons are not overlapping in time.

14. The apparatus of claim 12, wherein all of the beacons, to be sent by the access points using a given channel, are sent consecutively.

15. The apparatus of claim 12, wherein the controller is further adapted to cooperate to establish transmission times for the beacons to:

reduce a total time used to transmit a set of non-time overlapping beacons; and provide reduced beacon scan time and total search time for a wireless device that is adapted to receive the beacons.

16. The apparatus of claim 12, wherein the controller is further adapted to:

determine a beacon transmission time of one of the access points; and use the beacon transmission time to establish target beacon transmit times for a set of the access points in a given geographical area.

17. The apparatus of claim 12, further comprising an indication generator adapted to generate an indication regarding transmission of at least one next beacon by the at least one other access point.

18. A computer program product for an access point comprising:

a non-transitory computer-readable medium comprising code for causing at least one computer to:

cooperate, with at least one other access point, to determine when to transmit beacons of associated time division multiplexed wireless networks, and to maintain at least one defined spacing between successive transmissions of the beacons, wherein each beacon comprises an identifier of one of the time division multiplexed wireless networks; and transmit the beacons of at least one of the networks.

19. The computer program product of claim 18, wherein the access points transmit the beacons so that the beacons are not overlapping in time.

20. The computer program product of claim 18, wherein all of the beacons, to be sent by the access points using a given channel, are sent consecutively.

21. The computer program product of claim 18, wherein the non-transitory computer-readable medium further comprises code for causing the at least one computer to establish beacon transmission times to:

reduce a total time used to transmit a set of non-time overlapping beacons; and provide reduced beacon scan time and total search time for a wireless device that is adapted to receive the beacons.

22. The computer program product of claim 18, wherein the non-transitory computer-readable medium further comprises code for causing the at least one computer to:

determine a beacon transmission time of one of the access points; and use the beacon transmission time to establish target beacon transmit times for a set of the access points in a given geographical area.

23. The computer program product of claim 18, wherein the non-transitory computer-readable medium further comprises code for causing the at least one computer to generate an indication regarding transmission of at least one next beacon by the at least one other access point.

* * * * *